(No Model.)
L. W. EVANS.
NUT LOCK.
No. 401,019. Patented Apr. 9, 1889.
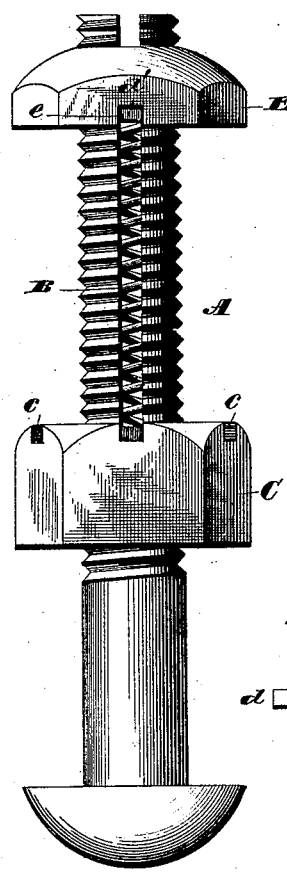
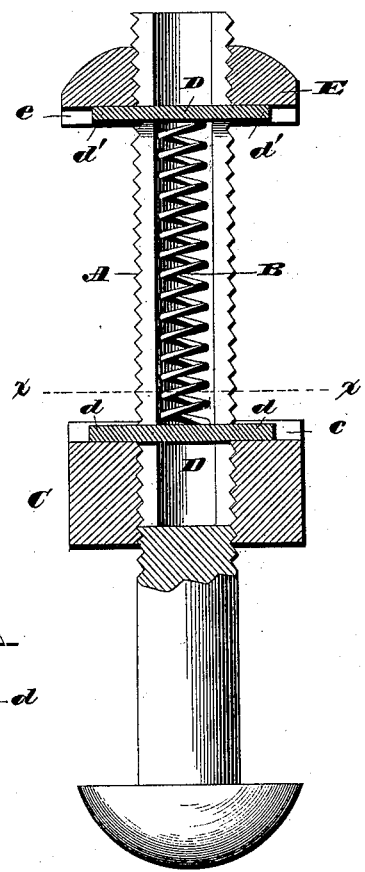
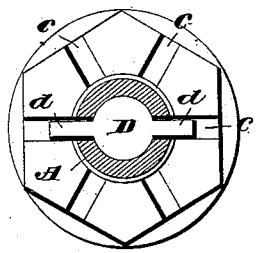
WITNESSES.
G. S. Elliott
E. M. Johnson
Lewis W. Evans,
INVENTOR,
by 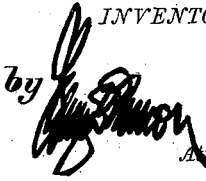
Attorney.

UNITED STATES PATENT OFFICE.

LEWIS W. EVANS, OF UPPER TYGART, KENTUCKY.

NUT-LOCK.

SPECIFICATION forming part of Letters Patent No. 401,019, dated April 9, 1889.

Application filed November 30, 1887. Serial No. 256,570. (No model.)

*To all whom it may concern:*

Be it known that I, LEWIS W. EVANS, a citizen of the United States, residing at Upper Tygart, in the county of Carter and State of Kentucky, have invented a new and useful Improvement in Bolts for Fastening Railroad-Rails, of which the following is a specification.

My invention relates to certain new and useful improvements in nut-locks; and it consists in the novel construction and combination of the parts, as will be hereinafter fully set forth, and specifically pointed out in the claim.

The object of my invention is to provide an improved bolt and fastening for the nut, which are adapted to be used with each other, so that the nut can be secured to the bolt to prevent its turning thereon.

In the accompanying drawings, Figure 1 is a side view of my improved nut-lock, and Fig. 2 is a longitudinal section. Fig. 3 is a detail view of one of the plates detached, and Fig. 4 is a sectional view taken through the line $x\,x$ of Fig. 2.

A refers to the bolt, the screw-threaded portion of which is hollow or tubular and bifurcated by a longitudinal slot. This bolt is made hollow to receive and protect a spiral spring, B, which is placed within said hollow portion after the nut C has been placed upon the threaded portion of the bolt and turned home.

The nut C has formed in its face recesses or grooves $c\,c$, with which the projecting ends $d$ of plate D will engage. This plate D has its central portion rounded, so that it will lie within the hollow portion of the bolt, while the ends project through the slots formed in said bolt. Upon the rounded portion of the plate D one end of the spiral spring B will bear.

E refers to the upper locking-nut, which may be of less thickness than the nut C, and the under side of this nut E is recessed, as shown at $e$, with which recesses the projecting portions $d'$ of a plate, D', engage, and against this plate the spiral spring bears.

In operation, after the nut C has been screwed home, the plate D is inserted in the hollow portion of the bolt, so that the ends thereof will project through the slots, these ends engaging with the recesses $c$ in the nut C. The spiral spring is then placed within the hollow portion of the bolt and the plate D' placed above the same. The plate D' is then forced down to compress the spring and the nut E turned to hold said spring in a compressed condition and hold the plates D and D' in engagement with the recesses in the nuts. The upper nut, E, holds the split and hollow bolt from spreading, and the spring, being located within the hollow portion of the bolt, is protected from injury.

I am aware that prior to my invention it has been proposed to slot a bolt and place transverse bars in said slot, which are held separated by a spring, so that one of the bars would engage with a serrated nut, and I do not claim such construction as my invention, as in my improved nut-lock the spiral spring, being located within the bolt, is protected, and cannot be removed therefrom, and the locking-plates having rounded central portions are also held from displacement, and there is no possibility of the parts becoming detached or lost unless the nut E is removed, which can only be done after compressing the spring to remove the plate D' out of engagement with the recesses in said nut.

Having thus described my invention, I claim—

The combination, with a bolt, A, having the end opposite the head hollow and slotted, nuts C and E, provided with recesses, plates D and D', adapted to engage with said recesses, and a spring, B, located within the hollow portion of the bolt to bear upon said plates, substantially as shown, and for the purpose set forth.

LEWIS W. $\overset{\text{his}}{\times}$ EVANS.
mark

Witnesses:
JOHN HARRIS,
JOHN R. EVANS.